April 27, 1954

C. WHEATLEY 2,676,780

GATE VALVE

Filed April 23, 1951

INVENTOR.
CHARLES WHEATLEY
BY
C. M. McKnight
ATTORNEY

April 27, 1954 — C. WHEATLEY — 2,676,780
GATE VALVE
Filed April 23, 1951 — 2 Sheets-Sheet 2
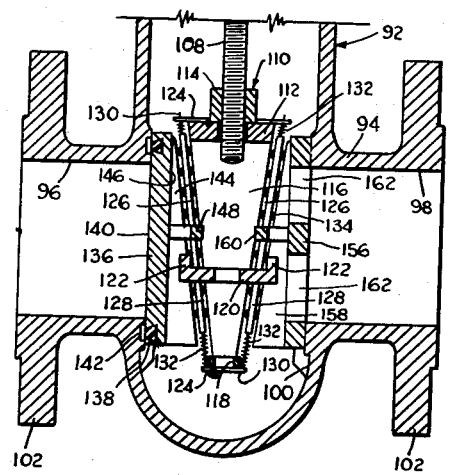
FIG. 5
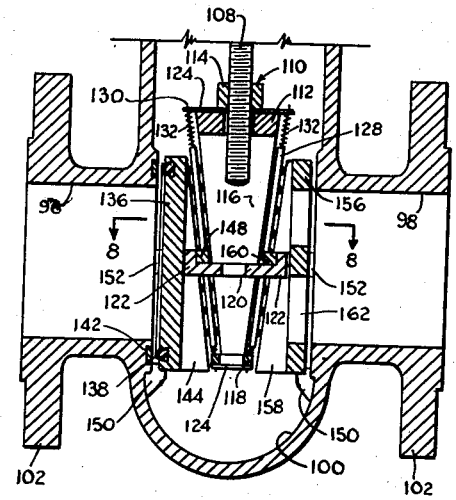
FIG. 6
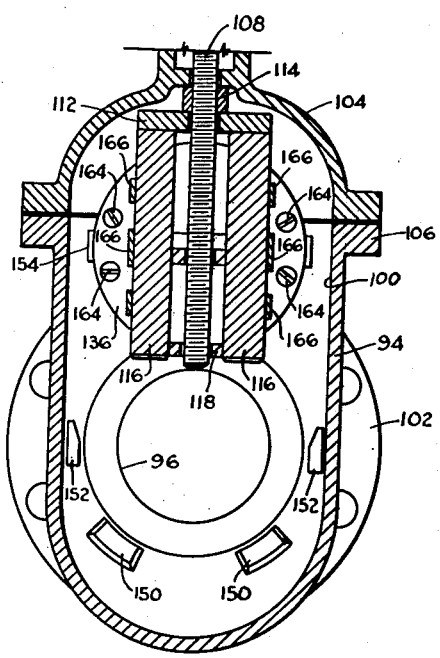
FIG. 7
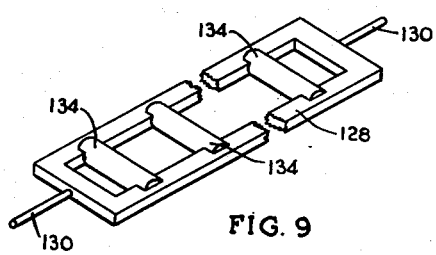
FIG. 8
FIG. 9
INVENTOR.
CHARLES WHEATLEY
BY
C. W. McKnight
ATTORNEY Patented Apr. 27, 1954

2,676,780

UNITED STATES PATENT OFFICE 2,676,780

GATE VALVE

Charles Wheatley, Tulsa, Okla.

Application April 23, 1951, Serial No. 222,359

3 Claims. (Cl. 251—204)

This invention relates to improvements in valves and more particularly, but not by way of limitation, to an improved gate type valve.

The conventional gate type valves are usually provided with a plug member adapted to be moved vertically in the valve body to cover and uncover the inlet and outlet apertures in the body. The plug member must necessarily be maintained in sealing contact with the valve seats surrounding the inlet and outlet apertures to provide a practical and efficient valve. It is readily seen that when the plug member is moved over the valve seats, the frictional forces resisting the movement of the plug will be large because of the close relationship between the plug and valve seats. It is also readily seen that when the valve is being initially opened, the pressure of the fluid will be exerted on the plug member over an area equal to the cross sectional area of the inlet aperture which tends to force the plug against the valve seat around the outlet aperture to increase the frictional forces resisting movement of the plug member. The conventional gate valves installed in high pressure fluid lines, and particularly the larger valves, must be provided with independent power units to open and close the valves, obviously resulting in an increased initial cost of each installation as well as higher maintenance costs.

The present invention contemplates a novel gate valve having a circular shaped valve plate adapted to seat on a valve seat provided around the inlet aperture of the valve body. The valve plate is actuated by a wedge shaped member in turn actuated by a valve stem. The wedge provides a small lateral movement of the valve plate during the initial opening and final closing of the valve. The valve plate, therefore, does not contact the valve seat during vertical movement of the valve plate, thereby reducing frictional resistance to a minimum.

An important object of this invention is to provide a novel gate valve wherein the frictional resistance to the opening and closing movements of the valve will be reduced to a minimum.

Another object of this invention is to provide a novel gate valve which may be manually operated when used in high pressure flow lines.

A further object of this invention is to provide a gate valve which will not be rendered more difficult to operate by increases in the flow line pressure.

A still further object of this invention is to provide a practical and efficient gate valve having a long service life and capable of being economically manufactured.

Other objects and advantages of the invention will be evident from the following detailed description, read in conjunction with the accompanying drawings, which illustrate my invention.

In the drawings:

Figure 5 is a partial longitudinal sectional view of a modified gate valve illustrating the valve in a closed position.

Figure 6 is a view similar to Fig. 5 illustrating the modified valve in a partially open position.

Figure 7 is another sectional view of the modified valve taken at right angles to Figs. 5 and 6 and illustrating the valve in a fully opened position.

Figure 8 is a sectional view taken along line 8—8 of Fig. 6.

Figure 9 is a detail of one of the bearing holders for the modified gate valve.

Figure 1:
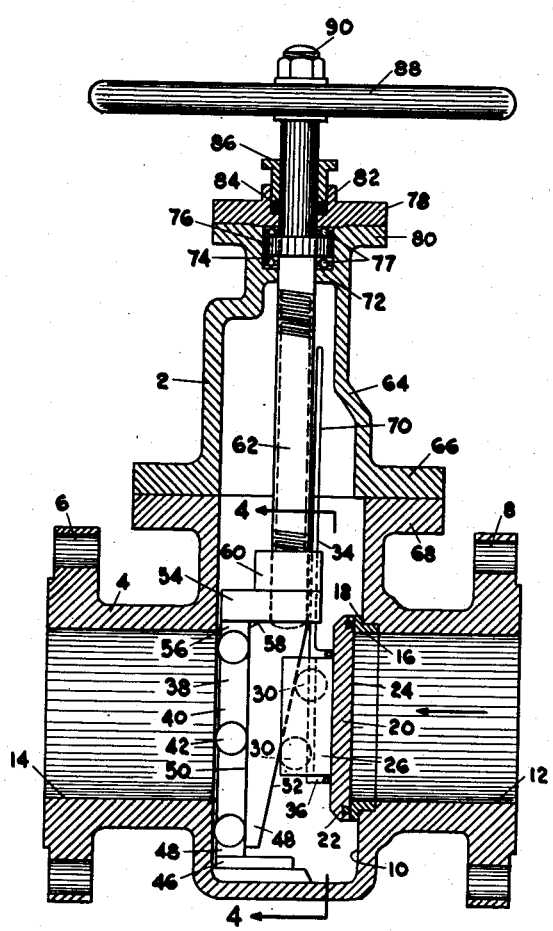
Figure 1 is a longitudinal sectional view of a novel gate valve illustrating the valve in a closed position.

Referring to the drawings in detail, and particularly Figure 1, reference character 2 generally designates a novel gate valve having a body portion 4. The usual flanges 6 and 8 are provided on the opposite ends of the body portion 4 to interconnect the valve 2 with a fluid flow line (not shown). A vertical chamber 10 is provided in the central portion of the body 4 and communicates with an inlet aperture 12 and an outlet aperture 14. An annular valve seat 16 is secured in the inlet aperture 12 and the faced portion 18 thereof extends into the chamber 10.

Figure 3:
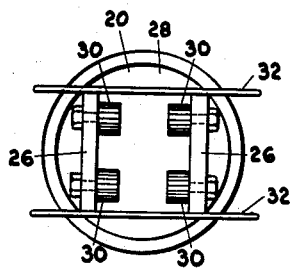
Figure 3 is a detail of the valve plate.

A circular shaped valve plate 20 disposed in the chamber 10 is adapted to move into seating relation on the head 18 of the valve seat 16 to close the inlet aperture 12 as will be more fully hereinafter set forth. A sealing ring 22 is carried by the valve plate 20 to provide a seal between the valve plate 20 and the seat 16. The sealing ring 22 protrudes from the outer face 24 of the plate 20 and is compressed onto the head 18 of the seat 16 when the plate 20 is in closed position as shown in Figure 1 to provide an efficient seal. A pair of vertically disposed plates 26 (see also Fig. 3) are secured in spaced relation on the inner face 28 of the plate 20. A pair of vertically spaced rollers or bearings 30 are carried by each plate 26 on the inner side thereof. The upper rollers 30 are spaced outwardly from the lower rollers 30 for purposes as will be hereinafter set forth. Transverse guide rods 32 are secured to the inner face 28 of the valve plate 20 above and below the plates 26. The rods 32 extend outwardly beyond the valve plate 20 into vertical grooves 34 (only one of which is shown) provided in the walls of the chamber 10 at opposite sides of the inlet aperture 12. Each groove 34 communicates with a pair of vertically spaced horizontal grooves 36 provided an equal distance above and below the center line (not shown) of the inlet aperture 12. The grooves 36 receive the ends of the rods 32 when the valve plate 20 is moved into a closed position as shown in Figure 1, and constrain the valve plate 20 to move in an axial direction during the final closing and initial opening movements thereof.

Figure 4:
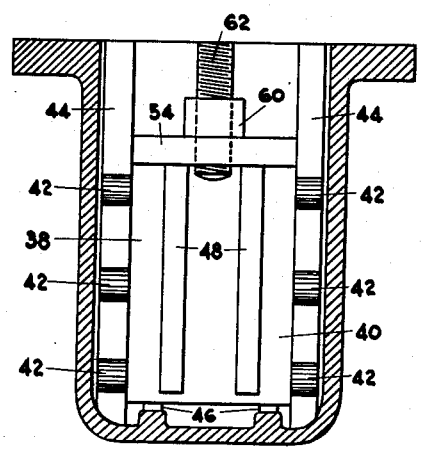
Figure 4 is a sectional view taken on lines 4—4 of Figure 1 with the valve plate removed.

A wedge member generally indicated at 38 (Figs. 1, 2, and 4) is disposed in the chamber 10 adjacent the valve plate 20. The wedge member 38 comprises a rectangular shaped plate or body portion 40 adapted to be disposed opposite the outlet aperture 14. Three (but not limited thereto) rollers or bearings 42 are carried in each side of the body 40 and are adapted to roll in vertical tracks 44 provided in the walls of the chamber 10. The tracks 44 are preferably formed out of a hard material and are disposed on opposite sides of the outlet aperture 14 as clearly shown in Fig. 4. A pair of horizontally disposed lifting arms 46 are secured to the lower end 48 of the body 40 and extend beneath the plates 26 of the valve plate 20. A pair of vertically disposed tapered plates 48 are provided in spaced relation on the inner face 50 of the body 40. The tapered faces 52 of the plates 48 contact the rollers 30 carried by the plates 26 as will be more fully hereinafter set forth. A horizontal flange or head portion 54 is secured to the upper end 56 of the wedge body portion 40 and the upper ends 58 of the tapered plates 48. A nut 60 is secured on the top face of the head 54 in the central portion thereof to receive a vertically disposed threaded shaft 62. The shaft or rod 62 extends downwardly from the nut 60 through an aperture (not shown) in the head 54 and upwardly from the nut 60 through a bonnet 64.

A circumferential flange 66 is provided on the lower end of the bonnet 64, and is secured to a mating flange 68 provided on the body portion 4 around the chamber 10 in the usual manner. A pair of opposed vertical grooves 70 are provided in the inner face of the bonnet 64 and communicate with the vertical grooves 34 to permit extended upward movement of the valve plate 20. Suitable tracks (not shown) are also provided in the bonnet 64 in communication with the tracks 44 to permit extended upward movement of the wedge member 38. An apertured partition 72 is provided in the upper portion of the bonnet 64 to provide a cylindrical recess or chamber 74. A circumferential flange 76 is provided on the shaft 62 and is retained in the chamber 74 by a pair of suitable thrust bearings 77. The upper thrust bearing 77 is retained in the correct operating position by a cap 78 secured to the upper flanged end 80 of the bonnet 64. A boss 82 is provided in the upper surface of the cap 78 to receive suitable packing 84 around the shaft 62. The packing 84 is retained in sealing position around the shaft 62 by a packing nut 86. A suitable handle 88 is secured on the upper end 90 of the shaft 62 to facilitate rotation of the shaft.

It will be apparent that the shaft 62 is retained in a fixed vertical position by the thrust bearing 77 through the medium of the circumferential flange 76. It will also be apparent that during rotation of the shaft 62 the nut 60 will cooperate with the threaded shaft 62 to move the wedge member 38 in a vertical direction depending upon the direction of rotation of the shaft 62.

*Operation*

Figure 2:
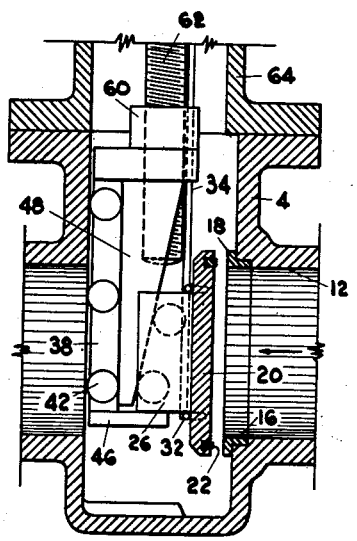
Figure 2 is a view similar to Figure 1 illustrating the valve in a partially opened position.

The gate valve 2 is preferably installed in a fluid flow line (not shown) in such a manner that the fluid flow is in the direction indicated by the arrows in Figures 1 and 2. Assuming the valve 2 is in a closed position, as shown in Fig. 1, and it is desired to open the same, the shaft 62 is rotated through the medium of the handle 88 to raise the wedge member 38. During the initial upward movement of the wedge member 38 the tapered faces 52 of the plates 48 will be removed from the rollers 30 to permit inward movement of the valve plate 20. The pressure of the fluid acting on the outer face 24 of the valve plate 20 will force the valve plate inwardly in the chamber 10 until the rods 32 enter the vertical slots or grooves 34 as shown in Fig. 2. Since fluid will then enter the chamber 10 to equalize the pressure on the opposite sides of the plate 20, the only force required to be exerted on the handle 88 is that which is necessary to move the wedge member 38 and valve plate 20 upwardly. The force required to initially move the wedge 38 is minimized by use of the rollers 42. The valve plate 20 is moved axially away from the valve seat 16 and is not dragged across the valve seat as in conventional gate valves.

During continued upward movement of the wedge member 38 the lifting arms 46 contact the lower ends of the plates 26 to raise the valve plate 20 away from the inlet aperture 12 and permit unrestricted flow of fluid through the valve. The grooves 34 and 70 through the medium of the guide rods 32 retain the valve plate 20 in a vertical position during upward movement thereof.

To close the gate valve 2, the handle 88 is turned in the opposite direction and the wedge member 38 is moved downwardly in the chamber 10. The valve plate 20 will be moved downwardly simultaneously with the wedge member 38, by the force of gravity, until the lower guide rod 32 contacts the lower ends of the grooves 34. The valve plate 20 will then be retained in a vertical position directly opposite the valve seat 16.

During continued downward movement of the wedge member 38, the tapered faces 52 of the plates 48 will contact the rollers 30 to move the valve plate 20 in an axial direction toward the valve seat 16. It will be noted that the ends of the guide rods 32 will move in the horizontal grooves 36 during outward movement of the valve plate 20. The wedge member 38 is continued moving in a downward direction through the medium of the shaft 62 and the handle 88 to firmly seat the sealing ring 22 of the valve plate 20 on the head 18 of the valve seat 16. During the final or wedging movement of the wedge member 38, the rollers 42 and 30 will minimize the frictional resistance to the wedging action.

Referring to Figs. 5 to 9, and particularly Fig. 5, reference character 92 generally indicates a modified gate valve comprising a body portion 94 having the usual inlet aperture 96 and outlet aperture 98 communicating with the centrally disposed valve chamber 100. Flanges 102 are provided around the inlet and outlet apertures 96 and 98 to permit interconnection of the valve 92 with a fluid flow line (not shown). A flanged bonnet 104 (Fig. 7) is secured to the upper flanged end 106 of the valve body 94 over the valve chamber 100 in the usual manner. The upper portion (not shown) of the bonnet 104 is constructed in a manner similar to the upper portion of the bonnet 64 of the preferred gate valve 2.

A threaded shaft 108 (Fig. 5) extends downwardly through the bonnet 104 into the valve chamber 100 and is rotatably held in a fixed vertical position in the same manner as the shaft 62 of the valve 2. A wedge member generally indicated at 110 is disposed in the valve chamber 100 on the shaft 108. The wedge member 110 comprises a rectangular shaped and apertured head plate 112 loosely disposed on the threaded shaft 108. A nut 114 is secured to the head plate 112 and is threadedly secured on the shaft 108 to provide vertical movement of the wedge member 110 during rotation of the shaft 108. A pair of tapered blocks 116 (see also Figs. 7 and 8) are secured in spaced relation on the lower face of the head plate 112. Each block 116 is tapered downwardly and inwardly for purposes as will be hereinafter set forth. An apertured supporting block 118 is provided on the lower ends of the blocks 116 to retain the blocks in spaced relation. An apertured lifting arm 120 extends transversely between the blocks 116 and is secured to the blocks in any suitable manner such as by welding. The lifting arm 120 is positioned slightly below the central portion of the blocks 116 and has its opposite ends 122 turned upwardly for purposes as will be hereinafter set forth. Suitable apertured brackets 124 are secured to the upper and lower ends of the wedge 110 and extend outwardly from the tapered faces 126 of the blocks 116. A rectangular shaped bearing holder 128 is provided adjacent each of the tapered faces 126 and has a guide rod 130 extending from each end thereof (see also Fig. 9). The guide rods 130 are reciprocatively disposed in the apertured brackets 124 to provide limited movement of the bearing holders 128. A helical spring 132 is provided around each of the guide rods 130 and cooperate with the respective bracket 124 to yieldably restrain movement of the bearing holders 128. A plurality of suitable roller type bearings 134 are rotatably secured in each bearing holder 128 and cooperate with the tapered faces 126 of the blocks 116 as will be more fully hereinafter set forth.

A circular shaped valve plate 136 is provided on one side of the wedge member 110 and is adapted to cover the inlet aperture 96 to preclude flow of fluid through the valve 92. A suitable sealing ring 138 is provided in the valve plate 136 and normally extends beyond the outer face 140 of the valve plate 136 to contact a seating ring 142 provided in the valve body 94 around the inlet aperture 96. The sealing ring 138 contacts the seating ring 142 when the valve plate 136 is in a closed position as illustrated in Fig. 5 to seal off the inlet aperture 96. A pair of vertically disposed and tapered plates 144 are secured in spaced relation on the inner face 146 of the valve plate 136. The plates 144 are spaced in the same manner as the tapered blocks 116 of the wedge member 110 and are tapered downwardly and inwardly in the same manner as the blocks 116 for purposes as will be hereinafter set forth. A lifting bracket 148 is secured to the inner face 146 of the valve plate 136 between the plates 144. The lifting bracket 148 is disposed along the transverse center line (not shown) of the valve plate 136 and cooperates with the lifting arm 120 upon upward movement of the wedge member 110 to lift the valve plate 136 as will be more fully hereinafter set forth. A pair of circumferentially spaced support lugs 150 (see also Fig. 7) are secured to the valve body 94 around the lower portion of the inlet aperture 96 to limit the downward movement of the valve plate 136 to a position opposite the inlet aperture 96. A pair of aligning lugs 152 are also provided in the valve body 94 on opposite sides of the inlet aperture 96 preferably along the transverse center line (not shown) of the inlet aperture 96. The aligning lugs 152 cooperate with suitable aligning bars 154 provided on opposite sides of the valve plate 136 to align the valve plate 136 with the inlet aperture 96 when the valve plate 136 is in the position shown in Figs. 5 and 6.

Another circular shaped valve plate 156 is provided on the opposite side of the wedge member 110 and is adapted to contact the valve body 94 around the periphery of the outlet aperture 98. A pair of tapered plates 158 are secured in spaced relation on the inner face of the valve plate 156 in the same manner as the tapered plates 144 on the valve plate 136. The plates 158 are also tapered downwardly and inwardly and cooperate with the wedge member 110 as will be hereinafter set forth. A lifting bracket 160 is secured to the medial portion of the valve plate 156 between the tapered plates 158 to cooperate with the lifting arm 120 upon upward movement of the wedge member 110. A pair of spaced apertures 162 are provided in the valve plate 156 and function as bleed-off passageways during the initial movements of the valve 92 as will be more fully hereinafter set forth. Support lugs 150 and aligning lugs 152 are also provided around the outlet aperture 98 in the same manner as around the inlet aperture 96. Furthermore, aligning bars (not shown) are provided on the opposite sides of the valve plate 156 in the same manner and for the same purpose as the aligning bars 154 on the valve plate 136.

A plurality of tension springs 164 (preferably four but not limited thereto) are interconnected at their opposite ends to the valve plates 136 and 156 as clearly shown in Figure 8. The tension springs 164 continually urge the valve plates 136 and 156 inwardly toward the wedge member 110 for purposes as will be hereinafter set forth. A plurality of vertically spaced guide arms 166 are secured to each of the valve plates 136 and 156 and extend inwardly to a position adjacent the opposite sides of the wedge member 110. The guide arms 166 retain the valve plates 136 and 156 in alignment with the wedge member 110.

Assuming the valve 92 is in a closed position as illustrated in Fig. 5, upon rotation of the shaft 108 by use of a suitable handle (not shown) the nut 114 cooperates with the threaded shaft 108 to raise the wedge member 110. As the wedge member 110 is moved upwardly from the position shown in Fig. 5 to the position shown in Fig. 6, the roller bearings 134 will have moved upwardly from the tapered plates 144 and 158 of the valve plates 136 and 156, respectively. The pressure of the fluid present in the inlet aperture 96 then acts on the outer face 140 of the valve plate 136 to move the valve plate 136 inwardly along the support lugs 150. Furthermore, the tension springs 164 will then pull the valve plate 156 inwardly into contact with the wedge member 110. A portion of the fluid in the inlet aperture 96 may then flow around the valve plate 136 into the valve chamber 100 and outwardly through the bleed-off passageways 162 into the outlet aperture 98. The fluid pressure on the opposite sides of the valve plate 136 will then be equalized, permitting free upward movement of the valve plate 136.

When the wedge member 110 has been moved upwardly to the position shown in Fig. 6 the upturned ends 122 of the lifting arm 120 will engage the lifting brackets 148 and 160. The valve plates 136 and 156 will then be moved upward simultaneously with the upward movement of the wedge member 110 to a position above the inlet and outlet apertures 96 and 98 as clearly shown in Fig. 7. Fluid flow through the valve 92 will then be completely unobstructed.

When it is desired to close the valve 92, the shaft 108 is turned in the opposite direction to move the wedge member 110 downwardly through the bonnet 104 and the valve chamber 100. The valve plates 136 and 156 will move downwardly simultaneously with the downward movement of the wedge member 110 and will contact the walls of the bonnet 104 and valve chamber 100 to preclude rotation of the wedge member 110. As the valve plates 136 and 156 contact the support lugs 150, further downward movement of the valve plates will be prohibited and the valve plates will be aligned by the aligning lugs 152. Upon further downward movement of the wedge member 110, the bearings 134 cooperate with the tapered blocks 116 and the tapered plates 144 and 158 to force the valve plates outwardly over the respective inlet and outlet apertures. When the valve plates 136 and 156 have been firmly seated against the valve body 94, further downward movement of the wedge member 110 will be prohibited.

It is readily seen that during the initial opening movements of the valve 92 the valve plates 136 and 156 will be moved inwardly away from the valve body 94. During the subsequent opening movements of the valve 92, the valve plates 136 and 156 will be moved freely upwardly in the valve chamber 100 and will not rub across the seating ring 142 of the valve body 94. As the valve plate 136 is initially moved inwardly, the fluid pressure will be equalized on the opposite sides of the valve plate 136, and in the event the valve plate 156 is not moved simultaneous with the inward movement of the valve plate 136, the fluid flowing into the valve chamber 100 will be permitted to escape through the apertures 162 and will not force the valve plate 156 into contact with the valve body 94. It is also readily seen that during the initial opening and final closing movement of the valve 92, the helical springs 132 will permit a slight movement of the bearing holders 128 and roller bearings 134 to assure freedom in the cooperative movements of the wedge member 110 and the tapered plates 144 and 158.

From the foregoing it is apparent that the present invention provides a novel gate valve wherein the frictional resistance to the opening and closing movements of the valve will be reduced to a minimum, thereby permitting the valve to be manually operated even though the valve may be utilized in a high pressure flow line. The valve may be opened or closed with substantially the same ease of operation independent of the pressure of the flow line in which the valve is interposed. It is also apparent that the present invention provides a practical and efficient gate valve having a long service life and which may be economically manufactured.

Changes may be made in the combination and arrangement of parts as heretofore set forth in the specification and shown in the drawings, it being understood that any modification in the precise embodiment of the invention may be made within the scope of the following claims without departing from the spirit of the invention.

I claim:

1. In a gate valve, a body provided with an inlet aperture and an outlet aperture at least one of which is provided with a valve seat, a wedge member reciprocable in said body transversely of said apertures and having two oppositely disposed wedge faces, two plates flanking the two opposite faces of said wedge member and spaced therefrom, at least one of said plates being a valve plate for cooperation with said valve seat, means providing a lost-motion connection between said plates and said wedge member, similar assemblies of anti-friction bearing means interposed in the spaces between said plates and the oppositely disposed wedge faces of said wedge member respectively, said assemblies of antifriction bearing means each including a plurality of rotative members having diametrically opposite faces in contact with complemental opposed faces of said plates and wedge member respectively and carrier means for maintaining said rotative members in predetermined relative spacing while permitting their individual independent rotation, means for imparting reciprocation to said wedge member and therethrough to said plates, thereby to move said valve plate from seating to non-seating relation to said valve seat, said assemblies of antifriction bearing means being capable of linear movement in said spaces during relative movement of said wedge member and plates and means for limiting movement of said valve plate in valve closing travel to register it with said valve seat, relative movement between said wedge member and plates serving by the functioning of said wedge member acting through said assemblies of antifriction bearing means to force said valve plate to said valve seat by reaction of said other plate against said body.

2. A gate valve as claimed in claim 1, in which the carrier means of said bearing assemblies are provided with resilient means for their support with respect to said wedge member, said resilient means serving normally to bias said assemblies to a predetermined midposition between said plate members and wedge member.

3. A gate valve as claimed in claim 1, in which said wedge member and plate members are provided with means for yieldingly maintaining contact between the rotative members of said bearing means and the surfaces of said plate members and wedge member cooperating therewith.

References Cited in the file of this patent

UNITED STATES PATENTS

| Number | Name | Date |
| --- | --- | --- |
| 154,121 | Brown | Aug. 18, 1874 |
| 587,107 | Sherrererd | July 27, 1897 |
| 653,600 | Wiley | July 10, 1900 |
| 954,930 | Collar | Apr. 12, 1910 |
| 1,868,147 | Kruse | July 19, 1932 |
| 1,999,155 | Karnath | Apr. 23, 1935 |
| 2,198,639 | Stines | Apr. 30, 1940 |

FOREIGN PATENTS

| Number | Country | Date |
| --- | --- | --- |
| 368,644 | Italy | 1939 |